United States Patent [19]
Helfet

[11] 3,801,990
[45] Apr. 9, 1974

[54] ARTIFICIAL LIMB WITH A JOINT THAT SIMULATES A BICONDYLAR JOINT MOVEMENT

[76] Inventor: Arthur Jacob Helfet, "Summerhill", Bebington Ave., Bishopscourt, Cape Town, South Africa

[22] Filed: Feb. 15, 1973

[21] Appl. No.: 332,708

[30] Foreign Application Priority Data
Feb. 16, 1972 Great Britain.................. 7079/72

[52] U.S. Cl.............................. 3/27, 3/29, 3/12.2
[51] Int. Cl.......... A61f 1/04, A61f 1/08, A61f 1/06
[58] Field of Search.......................... 3/22–29, 12.2, 3/12.3, 2

[56] References Cited
UNITED STATES PATENTS

| | | | |
|---|---|---|---|
| 1,384,850 | 7/1921 | Pringle et al............................. | 3/26 |
| 2,175,136 | 10/1939 | Stewart................................... | 3/28 X |
| 3,172,127 | 3/1965 | Tolotti..................................... | 3/27 |
| 3,351,955 | 11/1967 | Middleton............................. | 3/27 X |

FOREIGN PATENTS OR APPLICATIONS

| | | | |
|---|---|---|---|
| 168,874 | 9/1951 | Austria..................................... | 3/27 |
| 1,570,168 | 6/1969 | France..................................... | 3/26 |
| 691,264 | 5/1953 | Great Britain........................... | 3/27 |

*Primary Examiner*—Richard A. Gaudet
*Assistant Examiner*—Ronald L. Frinks
*Attorney, Agent, or Firm*—Kenyon & Kenyon Reilly Carr & Chapin

[57] ABSTRACT

A joint for an artificial limb which simulates a natural bicondylar joint such as a knee. It consists essentially of a pintle which articulates the upper and lower members and has a ball and socket connection at one end with both members and at the other end a non-slip rolling connection with one member and a journal bearing in the other member. The pintle is coupled to each member through a restraint or torque control unit such as a slipping friction clutch or a torsionally resilient unit. In the case of an artificial knee joint, the non-slip connection may either be with the tibia, in which case the axis of the pintle remains fixed relative to the femur and the tibia is twisted about its axis on the ball and socket pivot as flexion occurs; or the non-slip connection may be with the femur, in which case the axis of the pintle remains fixed in relation to the tibia but slews on the femur as flexion occurs. The relative proportion of tibial rotation to flexion is a function of the difference between the torques of the two couplings, whose characteristics at any point in the flexion/extension cycle can be varied by devices such as a one-way clutch, or cam control of the pressure of the slipping clutch.

9 Claims, 3 Drawing Figures

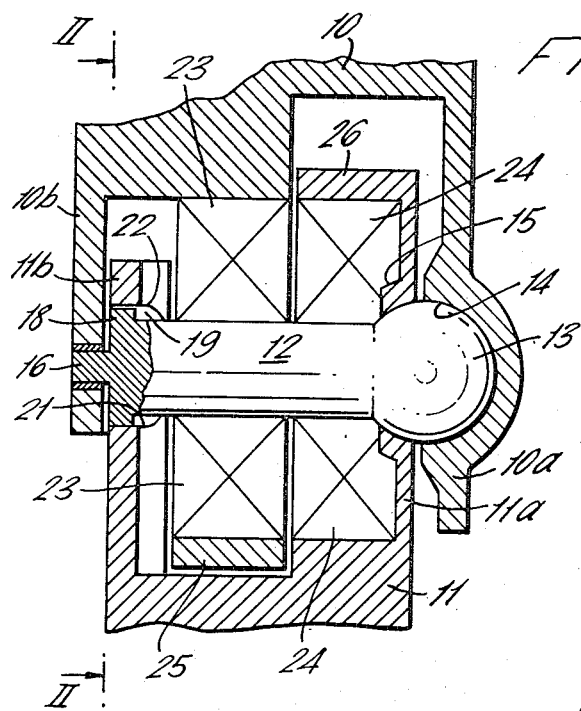
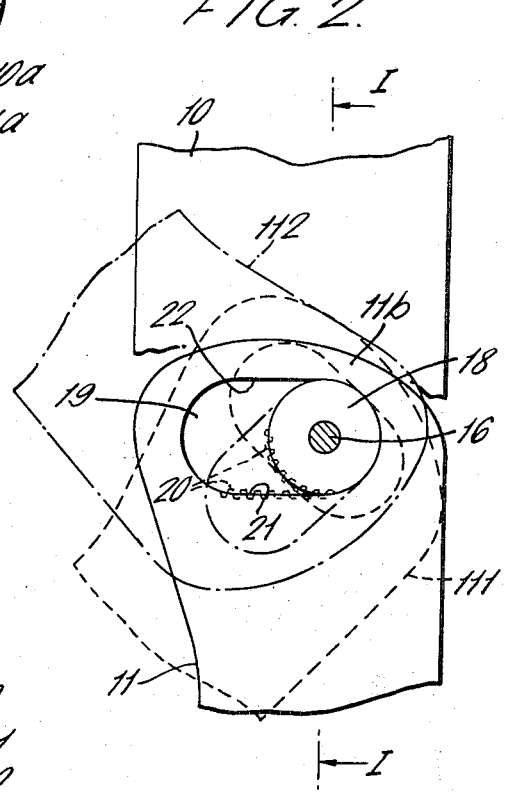

ARTIFICIAL LIMB WITH A JOINT THAT SIMULATES A BICONDYLAR JOINT MOVEMENT

This invention relates to artificial limbs (conventionally termed external prostheses), and specifically to the articulations thereof which represent the knee or elbow joint of a corresponding natural leg or arm. These joints are bicondylar in structure in the natural limbs, and permit the relative flexion between the articulated bones to be of a helicoidal nature, involving polar rotation of the lower limb member (forearm or lower leg) about its own longitudinal axis during flexion and extension of the limb.

Hitherto it has been common practice — especially in artificial legs used in above-knee amputations — to simulate the bicondylar joint by a hinge having a single fixed axis about which flexure occurs. However, in a healthy natural joint, the male (femoral or humerus) condyles and their coacting female (tibial or radial and ulnar) condyles dictate, under the control of the ligaments and muscles, a motion of the lower limb member on the upper member from the flexed to the extended position which includes a component of polar rotation about its axis in the sense for turning the extremity outwards. If, therefore, the knee joint of an artificial leg fails to reproduce this helicoidal motion, either the thigh muscles must be called upon to rotate the whole leg during flexion or extension, or the wearer is compelled to adopt an unfamiliar gait which seriously hampers both his balance and his mobility.

One of the problems encountered with artificial legs fitted after above-knee amputations is that, when the wearer walks, the shank of an artificial leg (which simulates the tibia) may tend to over-extend while the wearer's weight is being carried by the other leg. During this swing phase, which commences with lift-off of the toe at the start of the stride, the artificial shank swings in the manner of a pendulum, and unless there is some cushioning or damping facility as it approaches the fully extended position, the shank can make an undesirable impact on the extension stop structure which defines the fully extended attitude of the limb. Similarly, it may be desirable to assist the commencement of the swing of the shank immediately after toe lift-off.

Conversely, when the wearer of an artificial leg sits down, it is highly desirable that the shank of the artificial leg is not strongly biased at full flexion to the extended position.

Various different designs of viscous damper have already been produced to satisfy the complex and often conflicting desiderata for an artificial knee with varying degrees of success, but for the most part they have been applied to joints having a single hinge axis which is fixed relative to both the tibia and the femur, and which results in unnatural motion. Consequently, one significant cause of awkwardness or discomfort for the wearer when walking has always remained.

It is an object of the present invention to provide an artificial limb whose natural counterpart includes a bicondylar joint wherein the natural relative helicoidal motion of the healthy natural counterpart is simulated or approximated to a degree at least compatible with confidence and comfort of the wearer.

It is another object of the invention to provide a mechanical "bicondylar" joint in which the upper and lower members of the artificial limb are pivotally connected by a transverse pintle or like rigid pivot member which both permits rotation about its longitudinal axis and dictates angular displacement of that axis during flexion and extension of the limb.

A further object of the invention is to provide a pintle having a ball and socket connection at the lateral end with both members of the limb and a rolling engagement at the medial end with one of the members and a journal bearing in the other.

A still further object is to provide a restraint or torque-control (frictional and/or resilient) coupling between the pintle and each of the upper and lower members of the limb.

According to the present invention, a mechanical joint for an artificial limb is provided wherein the members of the limb to be articulated are interconnected by a common transverse pintle, each through a restraint or torque control element, and the pintle has a ball and socket pivot bearing at the lateral end in both limb members and, at the medial end, a non-slip rolling connection with one limb member and a journal bearing in the other such that rotation of the pintle on its pivot produces relative polar rotation of the limb members in the sense for deflecting the axis of flexure about the pintle in a plane substantially normal to the axis of the limb when fully extended to give the required relative helicoidal motion.

A practical embodiment of the present invention as applied to an artificial leg is illustrated, by way of example, in the accompanying drawings in which:

FIG. 1 is a section through an artificial knee joint in the plane containing the axis of the leg in extension, as represented by the section line of FIG. 2, and the axis of the pintle;

FIG. 2 is a section on the line II—II of FIG. 1, and

FIG. 3 is a section similar to FIG. 1 showing a modification.

No attempt is made in the drawings to represent the external contours of the limb since these are cosmetic details which can be varied from patient to patient as is customary in the art. The components illustrated represent the load-bearing elements of an artificial leg.

Referring first to FIGS. 1 and 2 of the drawings, the artificial femoral element 10 is articulated to the artificial tibial element 11 (hereinafter referred to for convenience as "femur" and "tibia") by means of a rigid pintle 12 whose axis intersects overlapping femoral and tibial walls 10a, 11a, respectively on the lateral side and similar overlapping walls 10b, 11b respectively on the medial side of the joint. As shown in FIG. 1, the lateral end of the pintle 12 is formed as a spherical ball 13. Sockets 14, 15 on the femoral and tibial walls 10a, 11a, respectively snugly embrace the ball 13 with sufficient clearance to allow the tibia 11 to execute a compound motion thereon the components of which are rotation of the tibia about the axis of the pintle 12 and polar rotation thereof about its own axis.

The medial extremity of the pintle is journalled at 16 in the femoral medial wall 10b, and inboard of this journal is fixed a cam or wheel 18 which lies snugly within a generally fore-and-aft slot 19 (FIG. 2). The cam or wheel 18 has non-slip rolling contact with the lower edge 21 of the slot — as by teeth (indicated schematically at 20 in FIG. 2) on the edge 21 and on that part of the circumference of the cam 18 which will engage therewith — and sliding contact with the upper edge 22 of the slot, which may carry a lining of low-friction material such as PTFE. The cam 18 and slot 19 constitute the medial tibial bearing on the pintle 12.

The pintle 12 is coupled to the femur 10 and the tibia 11 through respective restraint or torque control units 23, 24. The function of each restraint unit is to transmit to the pintle from the respective limb member (or vice versa) a predetermined torque the value of which may be a function of the design or of the material of the unit or may be variable in dependence on an external condition such as relative angular velocity or angle of flexion. Neither unit 23, 24 is designed to carry the tensile or compressive or bending loads on the joint during use; their function is to control the degree of rotation of the pintle 12 about its own axis as the tibia flexes and extends. This rotation of the pintle will therefore be a function of the differential torque of the two units in tandem. One unit may be primarily of a torsionally resilient character while the other is primarily of a frictional character, and each may be modified by being compounded with another device such as a one-way clutch, overload clutch, spasm lock, or the like. Each restraint or torque control unit 23 or 24 is located in a housing 25 or 26, respectively, on the associated femur or tibia.

In the construction described above, the ball end 13 of the pintle 12 and its coacting femoral and tibial cups or sockets 14, 15 represent the lateral condyles of a natural knee while the combination of the medial end bearing 16 in the femoral wall 10b and the cam or wheel 18 in the slot 19 in the tibial wall 11b represents the medial condyles of a natural knee. The restraint couplings 23, 24 represent the muscles and ligaments of a natural knee.

In operation, when the tibia 11 flexes on the femur 10 about the axis of the pintle 12, the restraint coupling 24 tends to rotate the pintle. This rotation is resisted by the tandem restraint coupling 23 which is anchored in the femur 10 so that the rotation of the pintle 12 about its axis is governed by the differential torque of these two couplings. As the tibia 11 swings about the pintle 12, the wall 21 defining the lower edge of the slot 19 rolls without slipping round the wheel or cam 18 so that the upper end of the tibia 11 also twists relatively to the femur 10 in an arc about the spherical bearing 14. If the pintle 12 does not rotate, this arc is circular. By the combination of this polar twist and the swing about the pintle 12, the tibia 11 is made to simulate the helicoidal motion of the natural limb. The dotted lines 111 and chain lines 112 in FIG. 2 show the relative progressive migration of the cam or wheel 18 along the slot 19 through an intermediate position to full flexion, respectively.

Investigators of knee disorders in recent years have postulated that the pattern of motion of the tibia relative to the femur in a healthy natural knee is consistent with a locus of an instantaneous centre of rotation which is a complex curve lying approximately in a plane generally parallel to the mean plane of swing of the tibia during flexion. Consequently the motion of the tibia on the femur in a healthy natural knee appears to involve a combination of both rolling and sliding at the condylar surfaces. In an artificial knee according to the present invention the characteristics of the relative helicoidal motion of the artificial tibia can be adjusted to suit the anatomical characteristics of the wearer by adjusting the angle of the axis of the slot 19 relative to the axis of the tibia, and the contour of the lower edge 21 thereof. In FIG. 2, these parameters are 90° and straight, respectively, but the latter may be curved to represent the contour of the tibial medial condyle of the natural limb which is being replaced by the artificial limb. Similarly, the periphery of the cam or wheel 18 can be contoured to represent the bearing surface of the femoral medial condyle. If the amputation has left the usual stump of the natural limb above the knee, the natural action of the hip joint and its controlling muscles can thus be preserved, so that pain and fatigue due to unnatural motion of the lower limb during walking can be alleviated or eliminated.

In the construction shown in FIGS. 1 and 2, polar rotation of the tibia 11 is achieved by holding the axis of the pintle 12 fixed in the femur 10 and causing the tibia to "roll round" the cam 18 as it swings in flexion or extension. The desired polar rotation of the tibia can also be achieved by fixing the axis of the pintle 12 relative to the tibia 11 and causing it to deflect relative to the femur 10. This alternative pintle arrangement is shown in FIG. 3, which also shows a modification of the structure of the ball and socket bearing 14.

Referring now to FIG. 3, the modified pintle 32 has a plain journal bearing 36 in the medial wall 11b of the tibia 11 and a spherical socket 34 embracing a ball 33 which is locked by a stem 37 in the adjacent lateral wall 10a of the femur 10. The tibial lateral wall 11a has a pivotal bearing socket 35 on the external surface of the pintle socket 34.

The cam or wheel 18 is now mounted on the medial extremity of the pintle 32 outside the plain journal 36 and engages the upper edge 22 of the slot 19 which is now formed in the medial wall 10b of the femur 10. Thus, when the pintle 32 rotates, its axis deflects with respect to the femur 10 in a pattern determined by the contours of the upper edge 22 of the slot 19 and of the periphery of the cam or wheel 18. The tibia 11, being journalled on the pintle, thus has a component of polar rotation superimposed by the pintle on the flexion and extension swing motion to give the helicoidal type of tibial motion which is performed by a healthy natural knee. The same arrangement of restraint or torque control units 23, 24 is used, but the arrangement of the socket end 34 of the pintle between the inner ball 33 and the outer tibial socket 35 enables a more compact assembly to be achieved.

The characteristics of the restraint or torque control couplings 23, 24 can be varied over a wide range of torque/deflection values both by intrinsic design and by combination with one-way clutches to allow free forward swing during a stride; or with a cam-operated friction clutch designed to overcome any leg-extending resilient torque in a coupling so as to facilitate sitting with the knee bent; or with a viscous-damped sprag or like positive detent device designed to yield under viscous damping to an inoperative position at normal relative velocities of the joint parts but to be retained in the operative locking position at the higher velocities associated with stumbling. Alternatively, it is known that electrical servo signals can be picked up from a muscle by implanted sensors, and that these can be amplified to operate a servo motor. Such a servo control can be used to lock the joint for a brief period in response to a natural reflex action of the stump muscles in an emergency, such as stumbling.

FIG. 3 also illustrates a schematic layout for a spasm lock for locking the joint temporarily in the event of the wearer's stumbling. It consists of a sprag or pawl 40 slidable in a guide boss 41 on a transverse wall part 42 of the femur 10. The tip of the sprag 40 engages a series of ratchet teeth 43 formed on the external circumference of the tibial restraint housing 26, the crest 44 of each tooth being curved in a circular arc struck about the centre of the ball 33 so that, as the tibia pivots helicoidally in flexion on its cup bearing 35 the depth of engagement of the tip of the sprag 40 does not vary. The general form of the ratchet teeth 43, seen in side elevation, is saw-toothed, but the steeper flank is chamfered at an acute angle to a radius drawn through the centre of the ball 33, and the coacting flank of the sprag tip is similarly chamfered so that when the tibia 11 flexes normally, the sprag 40 rides up the steeper flanks of the teeth.

The upper end of the sprag 40 is anchored in a piston 45 which is a slack fit in a cylinder 46 formed integral with or fixed to the femur 10. A light helical compression spring 47 preloads the piston 45 towards the bottom of the cylinder 46 and thus serves to hold the sprag 40 in contact with the ratchet teeth 43. The cylinder 46 is filled with an oil or like liquid having a viscosity such that it will leak past the piston 45 without unacceptable resistance at the slower rates of travel of the piston encountered during normal exercise of the limb. If, however, the wearer stumbles, the instantaneous relative angular velocity between the tibia 11 and the femur 10 exceeds the normal by a significant margin, so that the piston 45 is urged upwards into the cylinder 46 at a higher rate. The viscosity of the oil then imposes a higher restraint on the piston so that the sprag 40 remains engaged with the tooth 43 for a short period of time sufficient to afford time for the wearer to recover his balance with the other leg, or with any other available aid such as a walking stick. The piston 45 may, of course, be replaced by a diaphragm and conventional "non-return" oil bypass.

The above-described structure of a spasm lock is mechanically possible and serves to illustrate the principles involved. A practically acceptable design might require a less coarse-pitch arrangement than the ratchet-and-pawl principle described. If the arc of swing of the tibia over which spasm lock is required is sufficiently limited, it may be possible to use only one tooth 43, so that the mechanism becomes, in effect, a controlled cam and follower mechanism. Alternatively, the teeth 43 may be of more conventional gear shape in cross-section to mesh with a sector journalled in the femur 10 and constituting a nut working through a quick-pitch screw thread on an axially displaceable rod whose displacement is controlled by a dashpot mechanism similar to the piston and cylinder mechanism 45,46.

It will be understood that a variety of alternative arrangements of spasm lock can be provided, including electromagnetic devices energised from signals picked up from the thigh muscles.

The non-slip contact between the cam or wheel 18 and the appropriate edge 21 or 22 of the slot 19 can be ensured in any preferred manner; for example the co-acting portions of the two components can be geared together by a taut inelastic cord wrapped round the cam or wheel 18 and anchored at its free ends to opposite ends of the appropriate wall 21 or 22 of the slot 19 to give non-slip, low-friction drive between the cam 18 and the slot.

The maximum of polar rotation of the tibia 11 about its axis is also determined by the radius of the wheel or cam 18 and the length of the slot 19, both of which can be chosen at will to suit other design criteria of any particular limb.

What I claim is:

1. A mechanical joint for an artificial limb to replace a natural limb having a bicondylar articulation between upper and lower limb members comprising
   rigid upper and lower limb elements each having medial and lateral side walls which overlap the respective corresponding medial and lateral side walls of the other element with working clearance;
   a pintle constituting a transverse pivot interconnecting the said elements and pivotally supported at its lateral end by a common ball on the lateral side walls of the said elements and at its medial end by a journal bearing in the medial side wall of one of the said elements and by a non-slip bearing on one edge of a slot in the medial side wall of the other element, and
   separate restraint units coupling the pintle to the said upper and lower elements respectively.

2. A mechanical joint as claimed in claim 1 wherein the pintle is journalled at its medial end in the lower limb element.

3. A mechanical joint as claimed in claim 1 wherein the pintle is journalled at its medial end in the upper limb element.

4. A mechanical joint as claimed in claim 1 wherein the non-slip bearing is provided by a cam fixed on the pintle.

5. A mechanical joint as claimed in claim 1 wherein the common ball is formed on the pintle and the lateral side wall of each limb element has a socket embracing part of the said ball.

6. A mechanical joint as claimed in claim 1 wherein the common ball is fixed on the lateral side wall of one of the said limb elements, the pintle has a socket embracing part of the said ball and having a part-spherical external surface, and the lateral side wall of the other limb element has a socket embracing part of the said pintle socket.

7. A mechanical joint as claimed in clain 1 wherein one of the restraint units is a slipping frictional clutch.

8. A mechanical joint as claimed in claim 1 wherein one of the restraint units has a torsionally resilient characteristic.

9. A mechanical joint as claimed in claim 1 combined with a spasm lock for locking the joint in an emergency and comprising a positive detent engageable with both limb elements in the operative position and resiliently displaceable to the inoperative position against a viscous damping device whose resistance to displacement is a function of the rate of increase of the displacing force.

* * * * *